(12) United States Patent
Choi

(10) Patent No.: US 12,461,158 B2
(45) Date of Patent: Nov. 4, 2025

(54) BATTERY INFORMATION REQUESTING APPARATUS AND METHOD

(71) Applicant: LG ENERGY SOLUTION, LTD., Seoul (KR)

(72) Inventor: Ho-Deuk Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/273,199

(22) PCT Filed: Jul. 27, 2022

(86) PCT No.: PCT/KR2022/011083
§ 371 (c)(1),
(2) Date: Jul. 19, 2023

(87) PCT Pub. No.: WO2023/013968
PCT Pub. Date: Feb. 9, 2023

(65) Prior Publication Data
US 2024/0069107 A1  Feb. 29, 2024

(30) Foreign Application Priority Data

Aug. 4, 2021  (KR) ........................ 10-2021-0102748

(51) Int. Cl.
*G01R 31/367*  (2019.01)
*H04L 12/40*  (2006.01)
(52) U.S. Cl.
CPC ...... *G01R 31/367* (2019.01); *H04L 12/40071* (2013.01); *H04L 2012/40215* (2013.01)
(58) Field of Classification Search
None
See application file for complete search history.

(56) References Cited

U.S. PATENT DOCUMENTS 8,612,733 B2  12/2013  Flippin
2011/0321061 A1  12/2011  Craddock et al.
(Continued)

FOREIGN PATENT DOCUMENTS

CN  103809490 A  5/2014
CN  106276447 A  1/2017
(Continued)

OTHER PUBLICATIONS

Office Action issued in corresponding Japanese Patent Application No. 2023-540676 dated Jul. 16, 2024. (Note: KR 10-2021-0036258 A was previously cited).
(Continued)

*Primary Examiner* — Jas A Sanghera
(74) *Attorney, Agent, or Firm* — Morgan, Lewis & Bockius LLP

(57) ABSTRACT

A battery information requesting apparatus according to embodiments of the present disclosure may include a communicator configured to communicate with a battery information providing device; a target information determiner configured to determine target information to be obtained; a target battery determiner configured to determine an offset for a target battery from which the target information is to be obtained in a preset battery list; and a controller configured to generate a request packet including the target information and the offset, send the generated request packet to the battery information providing device through the communicator, and receive a response packet including the battery information of the target battery corresponding to the target information from the battery information providing device through the communicator as a response to the request packet.

11 Claims, 8 Drawing Sheets

(56) References Cited

U.S. PATENT DOCUMENTS

| | | |
|---|---|---|
| 2012/0221757 A1 | 8/2012 | Craddock et al. |
| 2013/0019118 A1 | 1/2013 | Flippin |
| 2013/0193925 A1 | 8/2013 | Abe et al. |
| 2014/0129164 A1 | 5/2014 | Gorbold et al. |
| 2016/0121816 A1 | 5/2016 | Koo |
| 2016/0162268 A1 | 6/2016 | Bush et al. |
| 2017/0222275 A1 | 8/2017 | Krishnan et al. |
| 2018/0113836 A1 | 4/2018 | Hirata |
| 2019/0073160 A1 | 3/2019 | Okada |
| 2019/0227863 A1 | 7/2019 | Cho et al. |
| 2019/0302191 A1* | 10/2019 | Gorbold ............. G01R 31/3835 |
| 2019/0312314 A1 | 10/2019 | Bossi |
| 2020/0393965 A1 | 12/2020 | Xiao et al. |
| 2021/0037407 A1 | 2/2021 | Park |
| 2022/0158255 A1 | 5/2022 | Choi et al. |
| 2022/0206686 A1 | 6/2022 | Xiao et al. |
| 2023/0139353 A1* | 5/2023 | Monfort .................. B60L 58/12 307/10.1 |

FOREIGN PATENT DOCUMENTS

| | | |
|---|---|---|
| CN | 108604813 A | 9/2018 |
| JP | 2011-59844 A | 3/2011 |
| JP | WO2012/124233 A1 | 9/2012 |
| JP | 2013-533543 A | 8/2013 |
| JP | 2013-207898 A | 10/2013 |
| JP | 2019-61872 A | 4/2019 |
| JP | 6500875 B2 | 4/2019 |
| JP | 2021-513186 A | 5/2021 |
| KR | 10-0331469 B1 | 4/2002 |
| KR | 10-1573637 B1 | 12/2015 |
| KR | 10-1928156 B1 | 12/2018 |
| KR | 10-2019-0077578 A | 7/2019 |
| KR | 10-2019-0089457 A | 7/2019 |
| KR | 10-2020-0019706 A | 2/2020 |
| KR | 10-2020-0059752 A | 5/2020 |
| KR | 10-2021-0036258 A | 4/2021 |
| WO | 2017/203645 A1 | 11/2017 |
| WO | 2021/060900 A1 | 4/2021 |

OTHER PUBLICATIONS

International Search Report (with partial translation) issued Nov. 3, 2022 with Written Opinion in the corresponding International Patent Application No. PCT/KR2022/011083.

The extended European Search Report (EESR) dated Aug. 9, 2024, issued in corresponding EP Patent Application No. 22853346.9.

Office Action dated Jul. 17, 2025 issued in the corresponding Chinese Patent Application No. 202280009590.7.

\* cited by examiner

FIG. 2

| BATTERY LIST | OFFSET |
|---|---|
| FIRST BATTERY | p1 |
| SECOND BATTERY | p2 |
| THIRD BATTERY | p3 |
| FOURTH BATTERY | p4 |
| FIFTH BATTERY | p5 |
| SIXTH BATTERY | p6 |
| SEVENTH BATTERY | p7 |
| EIGHTH BATTERY | p8 |
| NINTH BATTERY | p9 |
| TENTH BATTERY | p10 |

FIG. 3

| Byte / PACKET TYPE | 1 | 2 | 3 | 4 | 5 | 6 | 7 | 8 |
|---|---|---|---|---|---|---|---|---|
| REQUEST PACKET | PACKET MAGNITUDE INFORMATION AREA | PACKET IDENTIFICATION INFORMATION AREA | DATA AREA | | | | | |

FIG. 4

| Byte<br>PACKET TYPE | 1 | 2 | 3 | 4 | 5 | 6 | 7 | 8 |
|---|---|---|---|---|---|---|---|---|
| REQUEST PACKET | | PACKET MAGNITUDE INFORMATION AREA | PACKET IDENTIFICATION INFORMATION AREA | | | | | |
| | DATA AREA ||||||||

FIG. 5

| Byte<br>PACKET TYPE | 1 | 2 | 3 | 4 | 5 | 6 | 7 | 8 |
|---|---|---|---|---|---|---|---|---|
| REQUEST PACKET | DLC | Service ID | DID(voltage) || p3 | 1 | | |

- Byte 1: PACKET MAGNITUDE INFORMATION
- Byte 2: PACKET IDENTIFICATION INFORMATION
- Bytes 3–4: TARGET INFORMATION
- Bytes 5–6: TARGET BATTERY INFORMATION
- Bytes 3–6: FIRST REQUEST GROUP (REQ1)

FIG. 6

| Byte / PACKET TYPE | 1 | 2 | 3 | 4 | 5 | 6 | 7 | 8 |
|---|---|---|---|---|---|---|---|---|
| REQUEST PACKET | DLC | Service ID | DID(voltage) | | p2 | 4 | p7 | 1 |

- Byte 1 (DLC): PACKET MAGNITUDE INFORMATION
- Byte 2 (Service ID): PACKET IDENTIFICATION INFORMATION
- Bytes 3–4 (DID(voltage)): TARGET INFORMATION
- Bytes 5–8 (p2, 4, p7, 1): TARGET BATTERY INFORMATION
- Bytes 3–8: SECOND REQUEST GROUP (REQ2)

FIG. 7

| Byte / PACKET TYPE | 1 | 2 | 3 | 4 | 5 | 6 | 7 | 8 |
|---|---|---|---|---|---|---|---|---|
| REQUEST PACKET | DLC | Service ID | DID(voltage) | | IDENTIFIER | p1 | 3 | |

- Byte 1 (DLC): PACKET MAGNITUDE INFORMATION
- Byte 2 (Service ID): PACKET IDENTIFICATION INFORMATION
- Bytes 3–4 (DID(voltage)): TARGET INFORMATION
- Bytes 5–7 (IDENTIFIER, p1, 3): TARGET BATTERY INFORMATION
- Bytes 3–7: THIRD REQUEST GROUP (REQ3)

FIG. 8

| Byte PACKET TYPE | 1 | 2 | 3 | 4 | 5 | 6 | 7 | 8 |
|---|---|---|---|---|---|---|---|---|
| REQUEST PACKET | DLC | | Service ID | | DID(voltage) | | | |
| | IDENTIFIER | DID(temperature) | | IDENTIFIER | p4 | IDENTIFIER | p6 | 3 |
| | | | | | | 2 | p8 | 1 |

FOURTH REQUEST GROUP (REQ4)
FIFTH REQUEST GROUP (REQ5)

FIG. 12

| Byte / PACKET TYPE | 1 | 2 | 3 | 4 | 5 | 6 | 7 | 8 |
|---|---|---|---|---|---|---|---|---|
| RESPONSE PACKET | DLC | | Service ID | DIO(voltage) | | | | |
| | IDENTIFIER | DIO(temperature) | | 20 | 20 | 3 | 3.01 | 3 |
| | | | | | | 20.2 | | |

SECOND RESPONSE GROUP (RES2): bytes 4–8 (DIO(voltage), 20, 20, 3, 3.01, 3)

THIRD RESPONSE GROUP (RES3): 20.2

BATTERY INFORMATION REQUESTING APPARATUS AND METHOD

TECHNICAL FIELD

The present application claims priority to Korean Patent Application No. 10-2021-0102748 filed on Aug. 4, 2021 in the Republic of Korea, the disclosure of which is incorporated herein by reference.

The present disclosure relates to a battery information requesting apparatus and method, and more particularly, to a battery information requesting apparatus and method, which may efficiently request battery information for a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-discharging rate and high energy density.

Meanwhile, various electronic control units (ECUs) are included in a device equipped with such a battery, and the ECUs communicate with each other to provide information or receive information from other ECUs. Taking a vehicle as an example, various functions and controls increase in the vehicle, and, in particular, as an electric vehicle equipped with a battery is put to practical use, the amount of data sent and received between ECUs is increasing. Accordingly, communication standards and technologies for improving the efficiency of data communication between ECUs have been proposed.

For example, Patent Literature 1 discloses an invention in which a data frame structure for CAN (Controller Area Network) communication is changed to increase the data amount, thereby improving data reception stability and communication speed to improve the traffic load of the CAN bus.

However, Patent Literature 1 discloses only a configuration in which the data receiving side changes the reception mode to the high-speed mode or the normal mode depending on whether the data length exceeds 8 bytes. Since Patent Literature 1 improves the traffic load only by changing the reception mode, it is difficult to apply to a device such as an electric vehicle in which various information on battery cells must be provided in real time. That is, according to Patent Literature 1, since the sending side has to transmit single information on each battery cell, there is a problem that it may take a considerable amount of time to transmit data.

In addition, Patent Literature 1 does not disclose a configuration for selectively requesting battery information and responding thereto for only some battery cells among the plurality of battery cells. Therefore, after receiving all the battery information for the plurality of battery cells, only the desired battery information needs to be extracted, so there is a problem that it may take a considerable time to obtain the desired battery information.

(Patent Literature 1) KR 10-1573637 B1

DISCLOSURE

Technical Problem

The present disclosure is designed to solve the problems of the related art, and therefore the present disclosure is directed to providing a battery information requesting apparatus and method capable of efficiently requesting battery information for a target battery among a plurality of batteries.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery information requesting apparatus according to one aspect of the present disclosure may comprise: a communication unit configured to communicate with a battery information providing device; a target information determining unit configured to determine target information to be obtained; a target battery determining unit configured to determine an offset for a target battery from which the target information is to be obtained in a preset battery list; and a control unit configured to generate a request packet including the target information and the offset, send the generated request packet to the battery information providing device through the communication unit, and receive a response packet including the battery information of the target battery corresponding to the target information from the battery information providing device through the communication unit as a response to the request packet.

The control unit may be configured to generate a request group including the target information and the offset, and generate the request packet according to a request data amount corresponding to the generated request group.

The control unit may be configured to calculate the request data amount corresponding to the generated request group, and generate the request packet in a packet structure corresponding to the calculated request data amount among a plurality of preset packet structures.

The control unit may be configured to generate the request packet in a preset first packet structure, when the calculated request data amount is less than a criterion amount.

The control unit may be configured to generate the request packet in a preset second packet structure, when the calculated request data amount is equal to or greater than the criterion amount.

The control unit may be configured to calculate the request data amount by computing a magnitude of total data requested for the request group.

The control unit may be configured to generate the request packet to include packet magnitude information of the request packet, packet identification information of the request packet, and information about the request group.

The control unit may be configured to include an identifier, which is set not to overlap with the target information and the offset in the request packet, between the target information and the offset, and calculate the request data amount by further considering a data magnitude requested for the identifier.

The control unit may be configured to, for each target information, generate a group based on whether the offset is continuous, generate target battery information by determining a representative offset and the number of included offsets for each generated group, and generate the request group to include the target battery information corresponding to the target information.

The control unit may be configured to determine any one of offsets included in each generated group as the representative offset.

A battery information requesting method according to another aspect of the present disclosure may comprise: a target information determining step of determining target information to be obtained; an offset determining step of determining an offset for a target battery from which the target information is to be obtained in a preset battery list; a request packet generating step of generating a request packet including the target information and the offset; a request packet sending step of sending the generated request packet; and a response packet receiving step of receiving a response packet including the battery information of the target battery corresponding to the target information as a response to the request packet.

A battery information providing system according to still another aspect of the present disclosure may comprise: the battery information requesting apparatus according to one aspect of the present disclosure; and a battery information providing device, including: a communication module configured to communicate with the battery information requesting apparatus; a battery information obtaining module configured to receive the request packet from the battery information requesting apparatus through the communication module, determine the target battery from the request packet by using the battery list, and obtain the battery information corresponding to the target information for the determined target battery; and a control module configured to generate the response packet including the target information and the battery information, and send the response packet to the battery information requesting apparatus through the communication module as a response to the request packet.

The control module may be configured to generate a response group including the target information and the battery information, calculate a response data amount corresponding to the generated response group, and generate the response packet in a packet structure corresponding to the response data amount among a plurality of preset packet structures.

Advantageous Effects

According to one aspect of the present disclosure, there is an advantage of efficiently requesting battery information for a target battery among a plurality of batteries. In particular, since only battery information for the target battery may be received as the response information without receiving battery information for all of the plurality of batteries, there is an advantage in that it is possible to efficiently request and check battery information for the target battery.

The effects of the present disclosure are not limited to the above, and other effects not mentioned herein will be clearly understood by those skilled in the art from the appended claims.

DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a diagram schematically showing an example of a battery list according to an embodiment of the present disclosure.

FIG. 3 is a diagram schematically showing a first packet structure according to an embodiment of the present disclosure.

FIG. 4 is a diagram schematically showing a second packet structure according to an embodiment of the present disclosure.

FIGS. 5 to 8 are diagrams schematically showing various embodiments of a request packet generated by the battery information requesting apparatus according to an embodiment of the present disclosure.

FIGS. 11 and 12 are diagrams schematically showing various embodiments of a response packet generated by the battery information providing system according to still another embodiment of the present disclosure.

EMBODIMENTS OF THE DISCLOSURE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
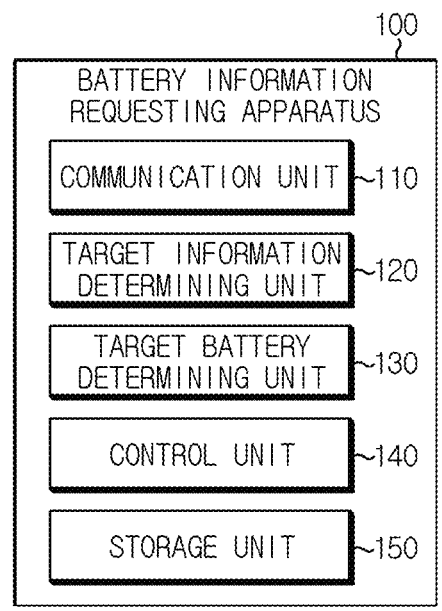
FIG. 1 is a diagram schematically showing a battery information requesting apparatus according to an embodiment of the present disclosure.

FIG. 1 is a diagram schematically showing a battery information requesting apparatus 100 according to an embodiment of the present disclosure.

Referring to FIG. 1, the battery information requesting apparatus 100 may include a communication unit 110, a target information determining unit 120, a target battery determining unit 130, and a control unit 140.

The communication unit 110 may be configured to communicate with a battery information providing device.

Here, the battery information providing device may be a device that provides battery information requested by the battery information requesting apparatus. For example, the communication unit 110 may be connected to the battery information providing device to be able to communicate therewith through wired and/or wireless communication.

The target information determining unit 120 may be configured to determine target information to be obtained.

Specifically, the target information may be determined among various battery information indicating the state of the battery, and one or more battery information may be determined as the target information.

For example, the battery information may include various information such as voltage, current, temperature, resistance, SOC and SOH, and the target information determining unit 120 may determine one or more of such various battery information as the target information.

Meanwhile, the battery refers to one physically separable independent cell having a negative electrode terminal and a positive electrode terminal. For example, a lithium-ion battery or a lithium polymer cell may be regarded as the battery. In addition, the battery may refer to a battery module in which a plurality of cells are connected in series and/or in parallel. Hereinafter, for convenience of description, the battery will be described as meaning one independent cell.

The target battery determining unit 130 may be configured to determine an offset for a target battery from which target information is to be obtained in a preset battery list.

Here, the offset means information of a location spaced apart by a certain interval from the start address of the battery list. That is, the offset for the target battery may mean a relative address from the start address in the battery list to the address where the identification code of the target battery is stored.

FIG. 2 is a diagram schematically showing an example of a battery list according to an embodiment of the present disclosure.

For example, in the embodiment of FIG. 2, first to tenth batteries may be included in the battery list. In addition, the offsets of the first to tenth batteries may be expressed as p1 to p10. Specifically, the offset of the first battery is p1, and the offset of the second battery is p2. Similarly, the offset of the ninth battery may be p9, and the offset of the tenth battery may be p10. That is, if the offset is determined, the target battery corresponding to the offset may be specified.

The control unit 140 may be configured to generate a request packet including the target information and the offset.

For example, it is assumed that the target information is "voltage" and the target battery is the "fifth battery". The target information may be determined as "voltage" by the target information determining unit 120, and the "offset for the fifth battery" may be determined by the target battery determining unit 130. Referring to FIG. 2, the target battery determining unit 130 may determine the offset for the fifth battery as p5. In addition, the control unit 140 may generate a request packet to include the "voltage" and the "offset for the fifth battery". That is, the request packet generated by the control unit 140 may be a communication packet that requests a voltage value for the fifth battery.

The control unit 140 may be configured to send the generated request packet to the battery information providing device through the communication unit 110. In addition, the control unit 140 may be configured to receive a response packet including the battery information of the target battery corresponding to the target information from the battery information providing device through the communication unit 110 as a response to the request packet.

In the preceding embodiment, when the control unit 140 sends the request packet for requesting a voltage value for the fifth battery to the battery information providing device, the control unit 140 may receive the response packet for the voltage value for the fifth battery from the battery information providing device.

That is, the battery information requesting apparatus 100 according to an embodiment of the present disclosure may specify a target battery from which target information is to be checked among a plurality of batteries included in the battery list, and selectively request only the target information for the corresponding battery. That is, since the battery information requesting apparatus 100 requests target information by specifying a target battery, it is possible to omit the processing for receiving target information for all batteries and selecting only the target information for the target battery. Accordingly, the battery information requesting apparatus 100 has an advantage of improving the processing speed in the process of obtaining target information for the target battery, and saving unnecessary system resources.

Meanwhile, the control unit 140 included in the battery information requesting apparatus 100 may optionally include an application-specific integrated circuit (ASIC), another chipset, a logic circuit, a register, a communication modem, and a data processing device, and the like, known in the art to execute various control logics disclosed below. In addition, when the control logic is implemented in software, the control unit 140 may be implemented as a set of program modules. In this case, the program module may be stored in a memory and executed by the control unit 140. The memory may be inside or outside the control unit 140, and may be connected to the control unit 140 by various well-known means.

In addition, the battery information requesting apparatus 100 may further include a storage unit 150. The storage unit 150 may store programs, data and the like required for diagnosing a state of a battery according to the present disclosure. That is, the storage unit 150 may store data necessary for operation and function of each component of the battery information requesting apparatus 100, data generated in the process of performing the operation or function, or the like. The storage unit 150 is not particularly limited in its kind as long as it is a known information storage means that can record, erase, update and read data. As an example, the information storage means may include RAM, flash memory, ROM, EEPROM, registers, and the like. In addition, the storage unit 150 may store program codes in which processes executable by the control unit 140 are defined.

The control unit 140 may be configured to generate a request group including the target information and the offset.

Specifically, the control unit 140 may generate the corresponding target information and the offset as one group.

For example, as in the previous embodiment, it is assumed that the target information is "voltage" and the target battery is the "fifth battery". The control unit 140 may generate a request group to include the "voltage" and the "offset to fifth battery". That is, the request group generated by the control unit 140 may include contents to request a voltage for the fifth battery.

The control unit 140 may be configured to generate a request packet according to a request data amount corresponding to the generated request group.

Specifically, the control unit 140 may be configured to calculate a request data amount corresponding to the generated request group.

For example, the control unit 140 may be configured to calculate the request data amount by computing the magnitude of the total data required for the request group.

Preferably, the data magnitude of each of the target information and the offset that may be included in the request group may be a predetermined fixed value. For example, the data magnitude of the target information may be 2 bytes, and the data magnitude of the offset may be 1 byte. Accordingly, the control unit 140 may calculate the request data amount corresponding to the request group by computing the magnitude of the total data required for the request group in consideration of the data magnitude of the offset and the target information included in the request group.

The control unit 140 may be configured to generate a request packet in a packet structure corresponding to the calculated request data amount among a plurality of preset packet structures.

Specifically, a plurality of packet structures that may be generated as a request packet may be set according to the amount of data that may be included. Hereinafter, for convenience of description, the plurality of preset packet structures will be described as including a first packet structure and a second packet structure.

For example, the first packet structure and the second packet structure may be distinguished according to the amount of data that may be included. For example, when the calculated request data amount is less than a criterion amount, the control unit 140 may generate a request packet in a preset first packet structure. Conversely, if the calculated request data amount is equal to or greater than the criterion amount, the control unit 140 may be configured to generate a request packet in a preset second packet structure.

FIG. 3 is a diagram schematically showing a first packet structure according to an embodiment of the present disclosure. FIG. 4 is a diagram schematically showing a second packet structure according to an embodiment of the present disclosure.

Referring to FIGS. 3 and 4, the first packet structure is a packet structure according to the embodiment of FIG. 3, and may be a packet structure of a controller area network (CAN) communication channel that may include 8 bytes of data. The second packet structure is a packet structure according to the embodiment of FIG. 4, and may be a packet structure of a controller area network with flexible data rate (CAN-FD) communication channel that may include 64 bytes of data. For example, if the request data amount is 5 bytes or less, the request packet may be generated in the first packet structure, and if the request data amount exceeds 5 bytes, the request packet may be generated in the second packet structure.

Preferably, the control unit 140 may be configured to generate the request packet to include packet magnitude information of the request packet, packet identification information of the request packet, and information about the request group.

In the embodiment of FIGS. 3 and 4, the first packet structure and the second packet structure may include a packet magnitude information area and a packet identification information area in common.

The packet magnitude information area may include information on the total data amount of the request packet.

The packet identification information area may include identification information for the request packet. Here, the identification information may be a Service ID according to a protocol. For example, according to the UDS 14229 protocol, when the state information of the battery for voltage, current, temperature and SOC is requested as the target information, the Service ID may be 0x22. In this case, 0x22 may be included as the identification information of the corresponding request packet in the packet identification information area.

The control unit 140 may be configured to generate a group for each target information based on whether the offset is continuous.

Here, whether the offset is continuous may be determined according to the presence or absence of a target battery in which the offset is continuous in the battery list. The offset may be expressed as an address relative to the start address, and the address distance between consecutive offsets may be set to be the same. Accordingly, when a plurality of offsets are received from the target battery determining unit 130, the control unit 140 may determine whether the plurality of received offsets are continuous. In addition, the control unit 140 may group consecutive offsets into one group.

For example, in the embodiment of FIG. 2, it is assumed that the first battery, the third to fifth batteries, the seventh battery, and the ninth battery are determined as target batteries. The control unit 140 may receive p1, p3, p4, p5, p7, and p9 as offsets of the target batteries from the target battery determining unit 130. The control unit 140 may generate a first group including p1 by checking the received offsets. Also, the control unit 140 may generate a second group including p3, p4, and p5. Also, the control unit 140 may generate a third group including p7 and a fourth group including p9.

The control unit 140 may be configured to generate target battery information by determining a representative offset and the number of included offsets for each generated group.

In the previous embodiment, the control unit 140 may determine the number of offsets included in the first group as 1, and determine the number of offsets included in the second group as 3. Also, the control unit 140 may determine the number of offsets included in each of the third group and the fourth group as 1.

Specifically, the control unit 140 may determine any one of the offsets included in each generated group as the representative offset.

For example, the control unit 140 may be configured to determine the minimum offset among the offsets included in each generated group as a representative offset. Here, the minimum offset is an offset closest to the start address of the battery list, and means an offset with the smallest relative address from the start address of the battery list. In the previous embodiment, since the offset included in the first group, the third group and the fourth group is one, the offset included in each group may be determined as a representative offset. Since three offsets are included in the second group, p3, which is the minimum offset among the three offsets, may be determined as the representative offset of the second group.

As another example, the control unit 140 may be configured to determine the maximum offset among the offsets included in each generated group as a representative offset. Here, the maximum offset is an offset farthest from the start address of the battery, and means an offset with the largest relative address from the start address of the battery list. In the previous embodiment, p5, which is the maximum offset among the offsets included in the second group, may be determined as the representative offset of the second group.

Hereinafter, for convenience of explanation, it will be described that the representative offset of the group is determined based on the minimum offset.

After determining the representative offset and the number of offsets, the control unit 140 may generate target battery information including the determined representative offset and the number of offsets. Thereafter, the control unit 140 may be configured to generate a request group to include target battery information corresponding to the target information.

That is, the request group may include target information determined by the target information determining unit 120 and target battery information (the representative offset and the number of offsets for each group) generated by the control unit 140.

FIGS. 5 to 8 are diagrams schematically showing various embodiments of a request packet generated by the battery information requesting apparatus 100 according to an embodiment of the present disclosure.

Specifically, FIGS. 5 to 7 show an embodiment of a request packet generated using the first packet structure, and FIG. 8 is an embodiment of a request packet generated using the second packet structure.

In the embodiment of FIGS. 5 to 8, packet magnitude information (Data Length Code, DLC) of the request packet may be included in the packet magnitude information area. For example, the packet magnitude information area may include a request data amount for the first request group REQ1. As another example, the packet magnitude information area may include the total data amount of the request packet. Preferably, the packet magnitude information area may include the total data amount of the request packet. Also, the packet identification information area may include a Service ID, which is the identification information of the request packet. For example, the Service ID may be 0x22 according to the USD 14229 protocol.

In the embodiment of FIG. 5, the data area may include the first request group REQ1 generated by the control unit 140. Specifically, the target information may include voltage information, and the target battery information may include group information including the representative offset p3. Referring to FIG. 2, the representative offset of the corresponding group is p3, and the number of offsets included in the group is one, so that only the third battery may be included in the corresponding group. That is, the request packet according to the embodiment of FIG. 5 may be a packet requesting voltage information for the third battery.

In the embodiment of FIG. 6, the data area may include a second request group REQ2 generated by the control unit 140. Specifically, the target information may include voltage information, and the target battery information may include information about the first group including the representative offset p2 and the second group including the representative offset p7. Referring to FIG. 2, the representative offset of the first group included in the second request group REQ2 is p2, and the number of offsets included in the first group is 4, so that the first group may include second to fifth batteries. In addition, since the representative offset of the second group included in the second request group REQ2 is p7, and the number of offsets included in the second group is one, so that only the seventh battery may be included in the second group. That is, the request packet according to the embodiment of FIG. 6 may be a packet for requesting voltage information for the second to fifth batteries and the seventh battery.

In the embodiment of FIG. 7, the data area may include a third request group REQ3 generated by the control unit 140. Specifically, the target information may include voltage information, and target battery information may include information about a group including the representative offset p1. Referring to FIG. 2, the representative offset of the group included in the third request group REQ3 is p1, and the number of offsets included in the group is three, so that the first to third batteries may be included in the corresponding group. That is, the request packet according to the embodiment of FIG. 7 may be a packet requesting voltage information for the first to third batteries.

In the embodiment of FIG. 7, an identifier may be further included in the third request group REQ3. Specifically, the control unit 140 may be configured to include an identifier, which is set not to overlap with the target information and the offset in the request packet, between the target information and the offset, and calculate the request data amount by considering the data magnitude required for the identifier further.

Here, the identifier may be set as a code capable of distinguishing the target information and the target battery information. That is, the identifier may be preset so as to be clearly identified from the target information and the target battery information. In addition, the identifier may be configured to set different values when a single target battery is included in the target battery information and when a plurality of target batteries are included.

For example, if the identifier has a value of 0000, it is assumed that one target battery is included in the target battery information, and if the identifier has a value of 1111, it is assumed that two or more target batteries are included in the target battery information. In the embodiment of FIG. 7, the target battery information may include information on the first to third batteries. Accordingly, in the embodiment of FIG. 7, the identifier may be set to a value of 1111. On the receiving side of the request packet, it is possible to effectively separate and identify the target information and the target battery information according to the presence or absence of an identifier, and there is an advantage in that the number of target batteries included in the target battery information can be checked without omission.

In the embodiment of FIG. 8, the data area may include a fourth request group REQ4 and a fifth request group REQ5. Specifically, the target information of the fourth request group REQ4 may include voltage information, and the target battery information may include information about the group including the representative offset p6. Referring to FIG. 2, the representative offset of the group included in the fourth request group REQ4 is p6, and the number of offsets included in the corresponding group is three, so that the group may include sixth to ninth batteries. That is, the fourth request group REQ4 may be a group for requesting voltage information for the sixth to ninth batteries.

In addition, in the embodiment of FIG. 8, the target information of the fifth request group REQ5 may include temperature information, and the target battery information may include information about the first group including the representative offset p4 and the second group including the representative offset p8. Referring to FIG. 2, the representative offset of the first group included in the fifth request group REQ5 is p4, and the number of offsets included in the first group is two, so that the fourth and fifth batteries may be included in the first group. In addition, since the representative offset of the second group included in the fifth request group REQ5 is p8, and the number of offsets included in the second group is one, so that the eighth battery may be included in the second group. That is, the fifth request group REQ5 may be a group that requests temperature information for the fourth battery, the fifth battery, and the eighth battery.

Accordingly, the request packet according to the embodiment of FIG. 8 may be a packet for requesting voltage information for the sixth to ninth batteries and temperature information for the fourth battery, the fifth battery, and the eighth battery.

Meanwhile, in the embodiment of FIG. 8, since the target battery information including a plurality of target batteries is included in the fourth request group REQ4 and the fifth request group REQ5, the identifiers included in the fourth request group REQ4 and the fifth request group REQ5 may be the same. For example, referring to the previous embodiment, the identifier may be set to 1111.

In addition, in the embodiment of FIG. 8, preset classification information may be further included in the request packet to separately identify a plurality of request groups. For example, the classification information may be preset to a dummy value, so that a plurality of request groups can be classified to be clearly identified.

Referring to the embodiment of FIGS. 5 to 8, the battery information requesting apparatus 100 according to an embodiment of the present disclosure has an advantage of selectively requesting battery state information for one or more of a plurality of batteries (e.g., a plurality of batteries included in the battery list). After receiving the battery state information for all batteries as in the prior art, the process of selecting battery state information for a desired target battery can be omitted, so there is an advantage of effectively saving time and system resources required to obtain information about the target battery.

Figure 9:
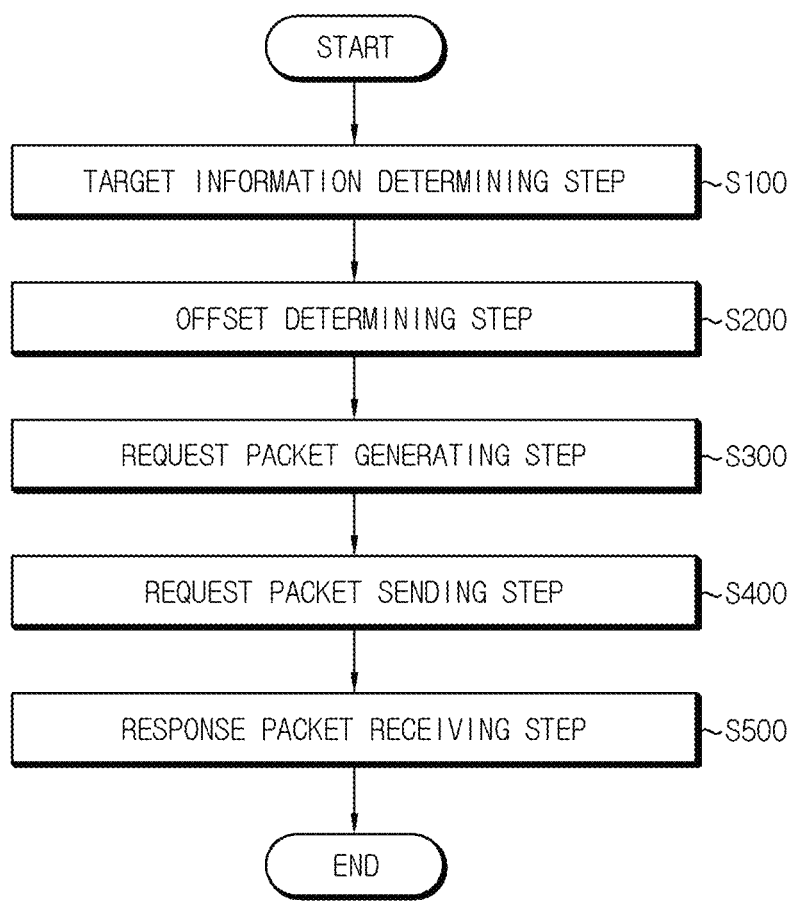
FIG. 9 is a diagram schematically showing a battery information requesting method according to another embodiment of the present disclosure.

FIG. 9 is a diagram schematically showing a battery information requesting method according to another embodiment of the present disclosure.

Each step of the battery information requesting method according to another embodiment of the present disclosure may be performed by the battery information requesting apparatus 100 according to an embodiment of the present disclosure. Hereinafter, for convenience of description, the content overlapping with the previously described content will be omitted or briefly described.

Referring to FIG. 9, the battery information requesting method may include a target information determining step (S100), an offset determining step (S200), a request packet generating step (S300), a request packet sending step (S400) and a response packet receiving step (S500).

The target information determining step (S100) is a step of determining target information to be obtained, and may be performed by the target information determining unit 120.

The target information is information such as voltage, current, temperature, resistance, and SOC, and may be battery state information to be obtained as a response to a request packet.

For example, in the embodiment of FIG. 5, the target information determining unit 120 may determine voltage information as the target information.

The offset determining step (S200) is a step of determining an offset for a target battery from which the target information is to be obtained in a preset battery list, and may be performed by the target battery determining unit 130.

Preferably, the offset may mean a relative address for each battery based on the start address of the preset battery list.

For example, in the embodiment of FIG. 5, the target battery may be determined as the third battery, and the offset for the third battery may be determined as p3 according to the battery list of FIG. 2.

The request packet generating step (S300) is a step of generating a request packet including the target information and the offset, and may be performed by the control unit 140.

Specifically, the control unit 140 may generate a request group including the target information and the offset, and generate a request packet in a packet structure corresponding to the generated request group.

For example, in the embodiment of FIG. 5, the control unit 140 may generate the first request group REQ1 to include the target information determined in the target information determining step (S100) and the offset determined in the offset determining step (S200). Specifically, the first request group REQ1 may include the target information and the target battery information. Since the offset determined in the offset determining step (S200) is one, the target battery information includes p3 as a representative offset, and 1 may be stored as the number of offsets.

More specifically, the control unit 140 may generate a request packet in a packet structure corresponding to the data amount of the generated request group among a plurality of preset packet structures.

For example, in the embodiment of FIG. 5, the control unit 140 may calculate the request data amount for the first request group REQ1 included in the data area as 4 bytes. In addition, this is a step in which the control unit 140 generates a request packet in a packet structure corresponding to the calculated request data amount among the plurality of preset packet structures, and may be performed by the control unit 140.

For example, it is assumed that the preset criterion amount is 6 bytes. In the embodiment of FIG. 5, since the request data amount corresponding to the first request group REQ1 is 4 bytes, the request data amount may be smaller than a criterion amount. Accordingly, the control unit 140 may generate a request packet in the first packet structure based on the calculated request data amount (4 bytes).

Conversely, if the request data amount corresponding to the request group is 6 bytes or more, the control unit 140 may generate a request packet in the second packet structure.

The request packet sending step (S400) is a step of sending the generated request packet, and may be performed by the control unit 140.

Specifically, the control unit 140 may send the generated request packet to the battery information providing device through the communication unit 110.

The response packet receiving step (S500) is a step of receiving a response packet including the battery information of the target battery corresponding to the target information as a response to the request packet, and may be performed by the control unit 140.

Specifically, the control unit 140 may receive a response packet including the battery information of the target battery from the battery information providing device through the communication unit 110. That is, the control unit 140 may receive a response (the battery information of the target battery) to the target information of the target battery requested through the request packet from the battery information providing device.

Since the battery information requesting method according to an embodiment of the present disclosure may selectively request only the target information for the target battery among the plurality of batteries included in the preset battery list, there is an advantage of obtaining the battery information for the target battery quickly. In addition, the battery information requesting method may prevent time and system resources from being wasted in the process of obtaining the target information for the target battery.

Figure 10:
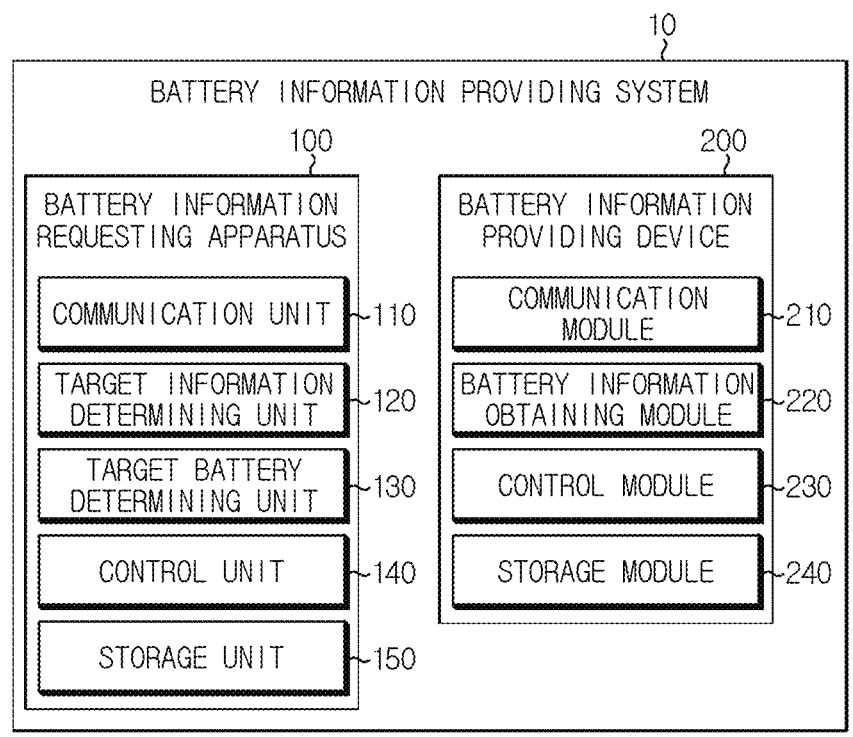
FIG. 10 is a diagram schematically showing a battery information providing system according to still another embodiment of the present disclosure.

FIG. 10 is a diagram schematically showing a battery information providing system 10 according to still another embodiment of the present disclosure.

Referring to FIG. 10, the battery information providing system 10 may include a battery information requesting apparatus 100 and a battery information providing device 200. Since the description of the battery information requesting apparatus 100 is duplicated, the battery information providing device 200 will be described below.

The battery information providing device 200 may include a communication module 210, a battery information obtaining module 220, a control module 230 and a storage module 240.

The communication module 210 may be configured to communicate with the battery information requesting apparatus 100.

For example, the communication module 210 may be connected to the battery information requesting apparatus 100 to enable wired and/or wireless communication. Specifically, the communication module 210 may be connected to communicate with the communication unit 110.

The battery information obtaining module 220 may be configured to receive a request packet from the battery information requesting apparatus 100 through the communication module 210.

In addition, the battery information obtaining module 220 may be configured to determine the target battery from the request packet using the battery list, and obtain battery information corresponding to the target information for the determined target battery.

Specifically, the battery information obtaining module 220 may determine a target battery and target information corresponding to the received request packet. For example, the battery information obtaining module 220 may determine the target battery by matching the offset included in the target battery information to the battery list.

In addition, the battery information obtaining module 220 may obtain battery information of the target battery corresponding to the target information included in the request packet by accessing the storage module 240.

Here, if there is no particular limitation on the type of the storage module 240 as long as it is a known information storage means capable of writing, erasing, updating and reading data. For example, the storage module 240 may include various battery information that may be measured by a measurement unit (not shown), and the battery information may include voltage, current, temperature, resistance, SOC, SOH, and the like.

The control module 230 may be configured to generate a response packet including the target information and the obtained battery information.

Specifically, the control module 230 may generate a response group including the battery information obtained by the battery information obtaining module 220, and may generate a response packet including the generated response group.

For example, the control module 230 may be configured to calculate a response data amount corresponding to the generated response group, and generate a response packet in a packet structure corresponding to the response data amount among the first packet structure and the second packet structure. Here, the target information may be the same as the target information included in the request packet. In addition, the battery information may be a value of the target information for the target battery in the target information.

For example, as in the previous embodiment, it is assumed that the battery information providing device 200 receives a request packet for requesting voltage (target information) for the fifth battery (target battery) from the battery information requesting apparatus 100. The battery information obtaining module 220 may obtain the voltage value (battery information) for the fifth battery by accessing the storage module 240. In addition, the control module 230 may generate a response packet including the voltage (target information) and the voltage value (battery information).

Figure 11:
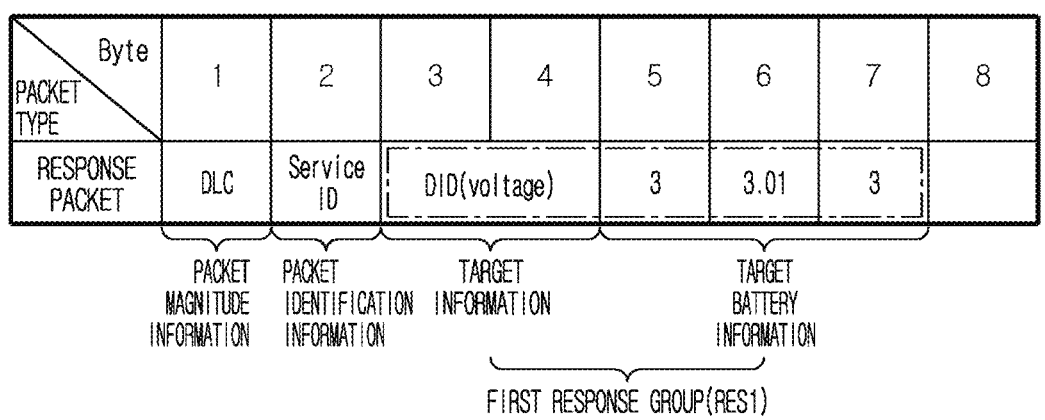

FIGS. 11 and 12 are diagrams schematically showing various embodiments of a response packet generated by the battery information providing system 10 according to still another embodiment of the present disclosure.

Specifically, the response packet according to the embodiment of FIG. 11 may correspond to the request packet according to the embodiment of FIG. 7. Referring to FIG. 11, the response packet may include packet magnitude information, packet identification information, and a first response group RES1. In addition, the first response group RES1 may include the target information (voltage) and the voltage values for the first battery, the second battery, and the third battery. For example, the voltage value for the first battery may be 3 V, the voltage value for the second battery may be 3.01 V, and the voltage value for the third battery may be 3 V.

Also, the response packet according to the embodiment of FIG. 12 may correspond to the request packet according to the embodiment of FIG. 8. Referring to FIG. 12, the response packet may include packet magnitude information, packet identification information, a second response group RES2, and a third response group RES3. In addition, the second response group RES2 may include the target information (voltage) and the voltage values for the sixth battery, the seventh battery, and the eighth battery. In addition, the third response group RES3 may include the target information (temperature) and the temperature values for the fourth battery, the fifth battery, and the eighth battery. For example, the temperature value for the fourth battery may be 20° C., the temperature value for the fifth battery may be 20° C., and the temperature value for the sixth battery may be 20.2° C.

On the other hand, preset classification information may be included between the second response group RES2 and the third response group RES3, so that the second response group RES2 and the third response group RES3 can be clearly distinguished. Accordingly, the battery information requesting apparatus 100 receiving the response packet may separately identify the second response group RES2 and the third response group RES3 based on the classification information.

The control module 230 may be configured to send a response packet to the battery information requesting apparatus 100 through the communication module 210 as a response to the request packet. Accordingly, the battery information requesting apparatus 100 may obtain a value of the target information for the target battery by receiving the response packet corresponding to the request packet from the battery information providing device 200.

The battery information providing system 10 according to an embodiment of the present disclosure is configured to request only the target information for the target battery among the plurality of batteries included in the battery list and respond thereto, so it is possible to save time required for the battery information requesting apparatus 100 to obtain the desired battery information. In addition, since the target information for the target battery is not selected after the target information for all batteries is requested and responded, it is possible to prevent system resources of the battery information providing system 10 from being unnecessarily wasted in the process of requesting and responding to the battery information.

The embodiments of the present disclosure described above are not necessarily implemented by an apparatus, method and system, but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery information providing system
100: battery information requesting apparatus
110: communication unit
120: target information determining unit
130: target battery determining unit
140: control unit
150: storage unit
200: battery information providing device
210: communication module
220: battery information obtaining module
230: control module
240: storage module

The invention claimed is:

1. A battery information requesting apparatus, comprising:
a communicator configured to communicate with a battery information providing device;
a target information determiner configured to determine target information to be obtained;
a target battery determiner configured to determine an offset for a target battery from which the target information is to be obtained in a preset battery list; and
a controller configured to generate a request packet including the target information and the offset, send the generated request packet to the battery information providing device through the communicator, and receive a response packet including battery information of the target battery corresponding to the target information from the battery information providing device through the communicator as a response to the request packet,
wherein the controller is configured to calculate a request data amount corresponding to a request group including the target information and the offset, and generate the request packet in a packet structure corresponding to the calculated request data amount among a plurality of preset packet structures.

2. The battery information requesting apparatus according to claim 1,
wherein the controller is configured to generate the request group including the target information and the offset.

3. The battery information requesting apparatus according to claim 2,
wherein the controller is configured to, for each target information, generate a group based on whether an offset is continuous, generate target battery information by determining a representative offset and the number of offsets included in each generated group, and generate the request group to include the target battery information corresponding to the target information.

4. The battery information requesting apparatus according to claim 3,
wherein the controller is configured to determine any one of the offsets included in each generated group as the representative offset.

5. The battery information requesting apparatus according to claim 1,
wherein the controller is configured to:
generate the request packet in a preset first packet structure, when the calculated request data amount is less than a criterion amount, and
generate the request packet in a preset second packet structure, when the calculated request data amount is equal to or greater than the criterion amount.

6. The battery information requesting apparatus according to claim 1,
wherein the controller is configured to calculate the request data amount by computing a magnitude of total data requested for the request group.

7. The battery information requesting apparatus according to claim 1,
wherein the controller is configured to generate the request packet to include packet magnitude information of the request packet, packet identification information of the request packet, and information about the request group.

8. The battery information requesting apparatus according to claim 7,
wherein the controller is configured to include an identifier, which is set not to overlap with the target information and the offset in the request packet, between the target information and the offset, and calculate the request data amount by further considering a data magnitude requested for the identifier.

9. A battery information providing system, comprising:
the battery information requesting apparatus according to claim 1; and
the battery information providing device, including:
a second communicator configured to communicate with the battery information requesting apparatus;
a battery information acquirer configured to receive the request packet from the battery information requesting apparatus through the second communicator, determine the target battery from the request packet by using the preset battery list, and obtain the battery information corresponding to the target information for the determined target battery; and a second controller configured to generate the response packet including the target information and the battery information, and send the response packet to the battery information requesting apparatus through the second communicator as a response to the request packet.

10. The battery information providing system according to claim 9,
wherein the second controller is configured to generate a response group including the target information and the battery information, calculate a response data amount corresponding to the generated response group, and generate the response packet in a packet structure corresponding to the response data amount among a plurality of preset packet structures.

11. A battery information requesting method, comprising:
determining target information to be obtained;
determining an offset for a target battery from which the target information is to be obtained in a preset battery list;
generating, by a controller, a request packet including the target information and the offset;
sending, by the controller, the generated request packet; and
receiving, by the controller, a response packet including the battery information of the target battery corresponding to the target information as a response to the request packet,
wherein the generating the request packet comprises:
calculating a request data amount corresponding to a request group including the target information and the offset; and
generating the request packet in a packet structure corresponding to the calculated request data amount among a plurality of preset packet structures.

* * * * *